D. AVERY.
WHIP.
No. 182,790.
Patented Oct. 3, 1876.
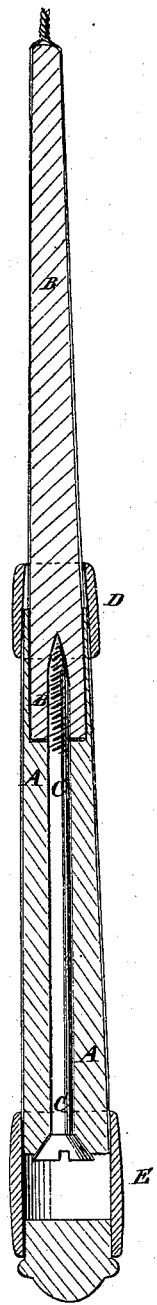

UNITED STATES PATENT OFFICE.

DEXTER AVERY, OF WESTFIELD, MASSACHUSETTS.

IMPROVEMENT IN WHIPS.

Specification forming part of Letters Patent No. 182,790, dated October 3, 1876; application filed August 14, 1876.

*To all whom it may concern:*

Be it known that I, DEXTER AVERY, of Westfield, Hampden county, Massachusetts, have invented a new and useful Improvement in Whips, of which the following is a specification:

The figure is a longitudinal section of the lower part or butt of a whip, illustrating my invention.

The object of this invention is to strengthen the whip at the joint, between the handle and stock, without increasing the cost of construction.

The invention consists in the handle counterbored from its forward end to receive the end of the stock, and provided with a screw or spike passing longitudinally through it from its lower end, and screwed or driven into the stock within said counter-bore, as hereinafter fully described.

A is the handle of the whip, which is made of wood, and is covered with woven or braided work, in the usual way. The handle A is bored longitudinally, and is counterbored from the forward end three inches, more or less, to receive the end of the stock B, which is made of the usual material, and is covered with woven or braided work, in the usual way, said covering extending into the counter-bore of the handle A or not, as may be desired. C is a screw or spike, which is passed through the handle A from its lower end, and is screwed or driven into the end of the stock B within the counter-bore of the said handle A, as shown in the figure. The ferrule D and the head E are then put on, in the usual way.

In making the whip, the handle A is turned and bored, and is then covered, sized, and dried before being counterbored, to prevent it from being split while being counterbored. The stock B is then put in, and the whip completed, as hereinbefore described.

Having thus described my invention, I claim as new and desire to secure by Letters Patent—

The handle A, counterbored from its forward end to receive the end of the stock B, and provided with a screw, C, passing longitudinally through it from its lower end, and screwed or driven into the stock B within said counter-bore, substantially as herein shown and described.

DEXTER AVERY.

Witnesses:
  M. B. WHITNEY,
  M. A. AVERY.